(12) United States Patent
Kuzuya et al.

(10) Patent No.: US 8,152,670 B2
(45) Date of Patent: Apr. 10, 2012

(54) HYBRID VEHICLE POWER TRANSMISSION DEVICE AND HYBRID VEHICLE

(75) Inventors: Tetsuro Kuzuya, Okazaki (JP); Ryuji Ibaraki, Nishikamo (JP); Kenji Odaka, Toyota (JP); Yuji Iwase, Mishima (JP); Tatsushi Takenaka, Toyota (JP); Tomoyuki Maruyama, Toyota (JP); Koichi Kondo, Toyoake (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 348 days.

(21) Appl. No.: 12/623,810

(22) Filed: Nov. 23, 2009

(65) Prior Publication Data

US 2010/0179010 A1 Jul. 15, 2010

(30) Foreign Application Priority Data

Jan. 14, 2009 (JP) ................. 2009-005334

(51) Int. Cl.
*F16H 3/72* (2006.01)
(52) U.S. Cl. .......................................... 475/5
(58) Field of Classification Search ........................ 475/5
See application file for complete search history.

(56) References Cited

U.S. PATENT DOCUMENTS

| | | | | |
|---|---|---|---|---|
| 7,905,807 B2 * | 3/2011 | Shimizu et al. | ................... | 475/5 |
| 2007/0265129 A1 * | 11/2007 | Kasuya et al. | ................... | 475/32 |
| 2008/0173487 A1 * | 7/2008 | Kamada et al. | ............... | 180/65.4 |
| 2008/0194368 A1 * | 8/2008 | Ebner et al. | ........................ | 475/5 |

FOREIGN PATENT DOCUMENTS

| | | |
|---|---|---|
| JP | 9-170533 | 6/1997 |
| JP | 2002-225578 | 8/2002 |
| JP | 2004-322761 | 11/2004 |

* cited by examiner

*Primary Examiner* — Edwin A Young
(74) *Attorney, Agent, or Firm* — Oblon, Spivak, McClelland, Maier & Neustadt, L.L.P.

(57) ABSTRACT

A hybrid vehicle power transmission device provided with a power distribution mechanism composed of a planetary gear device for distributing motive power of a drive source to a motor and an output shaft is further provided with a damper device in a power transmission path between the power distribution mechanism and a first motor. Consequently, the damper device receives only reaction torque dealt by the first motor through the power distribution mechanism with respect to drive torque of an engine. Thus, since the torque transmitted to the damper device is smaller than the drive torque of the engine, the torque capacity of the damper device can be decreased and the size of the damper device can be reduced. As a result, the overall size of the power transmission device can be similarly reduced.

5 Claims, 3 Drawing Sheets

HYBRID VEHICLE POWER TRANSMISSION DEVICE AND HYBRID VEHICLE

INCORPORATION BY REFERENCE

The disclosure of Japanese Patent Application No. 2009-005334 filed on Jan. 14, 2009, including the specification, drawings and abstract, is incorporated herein by reference in its entirety.

BACKGROUND OF THE INVENTION

1. Field of the Invention

The invention relates to a hybrid vehicle power transmission device and a hybrid vehicle, and more particularly to the reduction in size of a power transmission device.

2. Description of the Related Art

Hybrid vehicle power transmission devices, provided with a drive source, and a power distribution mechanism composed of a planetary gear device for distributing motive power of the drive source to a motor and an output shaft, are commonly known. The hybrid vehicle described in Japanese Patent Application Publication No. 2002-225578 (JP-A-2002-225578) is one example thereof. In the hybrid vehicle described in JP-A-2002-225578, a carrier of a power distribution mechanism (planetary gear mechanism) is coupled to the output shaft of a drive source, a sun gear is coupled to a motor (first motor generator), a ring gear is coupled to an output shaft (connecting drum), and drive force (drive torque) of the drive source input to the carrier is suitably distributed to the motor and the output shaft by the power distribution mechanism.

However, in the hybrid vehicle described in JP-A-2002-225578, a damper device for inhibiting torque fluctuations of the drive source is interposed in the power transmission path between the drive source and the power distribution mechanism (planetary gear mechanism). Since the damper device is directly coupled to the output shaft of the drive source, torque of the drive source is input directly to the damper device. Thus, since it becomes necessary to increase the torque capacity of the damper device, the size of the damper device increases. Thus, the problem of increasing size of the power transmission device arose accompanying increased size of the damper device in this manner.

SUMMARY OF THE INVENTION

The invention provides a hybrid vehicle power transmission device provided with a power distribution mechanism composed of a planetary gear device for distributing motive power of a drive source to a motor and output shaft that enables the size of the device to be reduced, and a hybrid vehicle equipped with a hybrid vehicle power transmission device that enables the size of the device to be reduced.

A hybrid vehicle power transmission device having a drive source and a power distribution mechanism composed of a planetary gear device for distributing motive power of the drive source to a motor and an output shaft as claimed in a first aspect of the invention is provided with a damper device in a power transmission path between the power distribution mechanism and the motor.

According to the hybrid vehicle power transmission device as claimed in the first aspect of the invention, since a damper device is provided in the power transmission path between the power distribution mechanism and the motor, direct transmission of drive torque of the drive source is avoided. More specifically, as a result of being composed in the manner described above, the damper device receives only reaction torque dealt by the motor through the power distribution mechanism with respect to drive torque of the drive source. Thus, since the torque transmitted to the damper device is smaller than the drive torque of the drive source, the torque capacity of the damper device can be decreased, and as a result, the size of the damper device can be reduced. Consequently, the overall size of the power transmission device can be similarly reduced.

The hybrid vehicle as claimed in a second aspect of the invention includes the hybrid vehicle power distribution device as claimed in the first aspect of the invention.

According to the hybrid vehicle as claimed in the second aspect of the invention, the size of a damper device can be reduced due to the effects of the first aspect of the invention. Thus, the overall size of the power transmission device can be similarly reduced. Moreover, the space for installing the power transmission device in the hybrid vehicle is easily secured.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

Here, the damper device may further include a torque limiter mechanism. If a torque limiter mechanism is so included, torque fluctuations of the drive source can be absorbed and malfunctions caused by excessive torque input to the damper device can be avoided.

The following provides a detailed explanation of embodiments of the invention with reference to the drawings. Furthermore, drawings of the embodiments may be suitably simplified or altered, and dimensional ratios, shapes and the like of each component are not necessarily depicted accurately.

Figure 1:
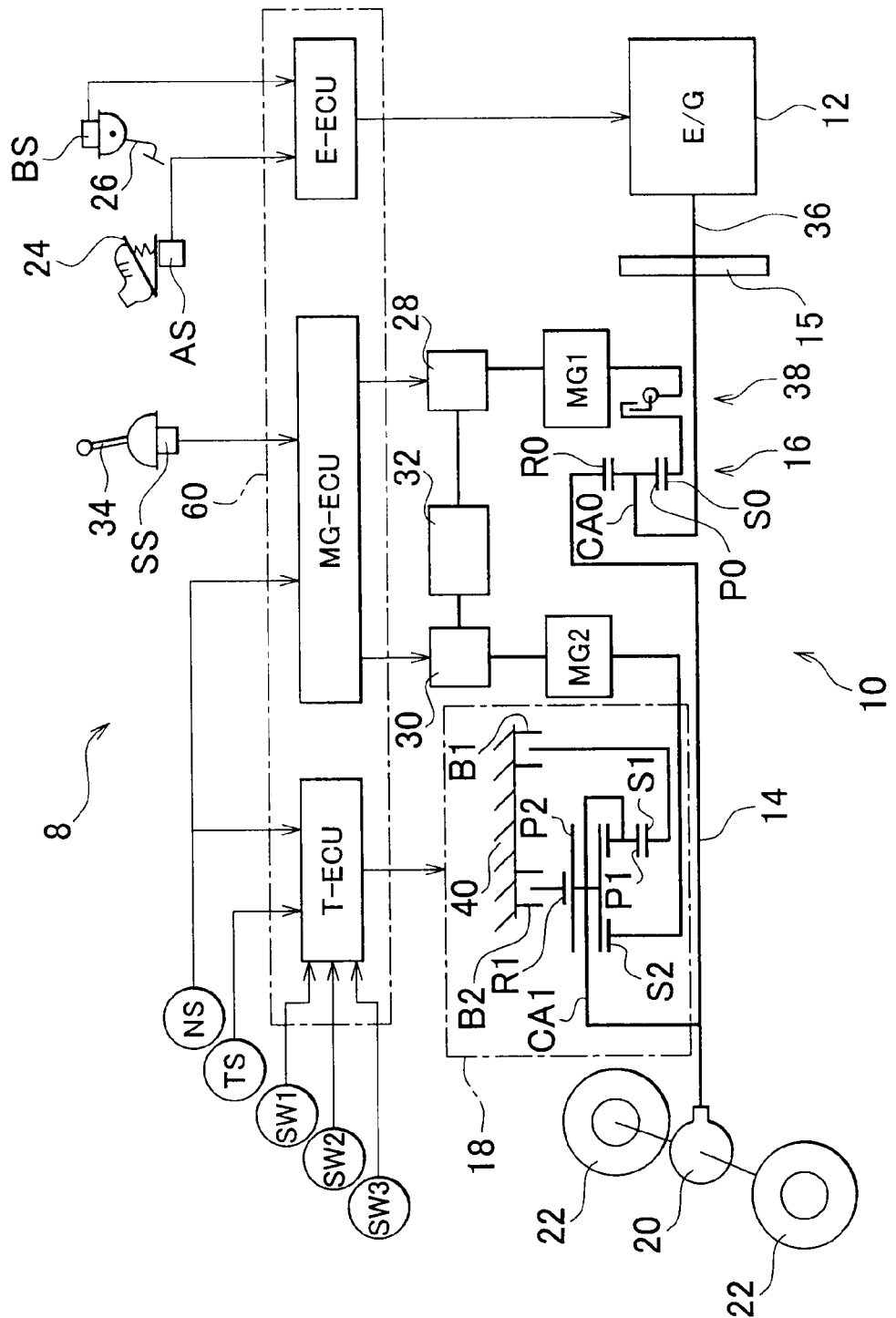
FIG. 1 is a drawing for explaining a hybrid vehicle in which the invention is applied.

FIG. 1 is a drawing for explaining a hybrid vehicle 8 in which the invention is applied. The hybrid vehicle 8 shown in FIG. 1 is composed by being provided with a hybrid vehicle power transmission device (to be simply referred to as a power transmission device) 10 having a power distribution mechanism 16, which distributes motive power output from a main power source in the form of an engine 12 (equivalent to the drive source of the invention) to a first motor generator MG1 and a transmitting member in the form of an output shaft 14, and a second motor generator MG2 differentially coupled to the output shaft 14 through a gear mechanism in the form of an automatic transmission 18. This power transmission device 10 is that used in a front-engine, rear-drive (FR) vehicle and the like, wherein torque output from the engine 12, the second motor generator MG2 and the like is transmitted to the output shaft 14, and torque from the output shaft 14 is transmitted to a pair of left and right rear wheels (drive wheels) 22 through a differential gear device 20. In addition, a flywheel 15 is provided on an input shaft 36. Furthermore, since the power transmission device 10 is symmetrically composed relative to the center line thereof, half of the device is omitted from FIG. 1.

In the power transmission device 10, torque transmitted from the second motor generator MG2 to the output shaft 14 is increased or decreased according to a gear ratio γs (=rotational speed of MG2/rotational speed of output shaft 14) set for the automatic transmission 18. This gear ratio γs of the automatic transmission 18 is composed to be set to one or more of a plurality of stages, and since output torque $T_{MG2}$ from the second motor generator MG2 can be increased and transmitted to the output shaft 14 during powering in which the MG2 torque $T_{MG2}$, is output, the second motor generator MG2 can be composed to have an even lower capacity and more compact size. As a result, in the case, for example, the rotational speed of the output shaft 14 has increased accompanying a high vehicle speed, the rotational speed of the second motor generator MG2 is lowered by lowering the gear ratio γs of the automatic transmission 18 in order to maintain favorable operating efficiency of the second motor generator MG2. In addition, in the case the rotational speed of the output shaft 14 has decreased, the gear ratio γs of the automatic transmission 18 is suitably increased.

The engine 12 is the main drive source of the hybrid vehicle 8, and is an internal combustion engine such as a gasoline engine or diesel engine that outputs motive power by causing combustion of a prescribed fuel. In addition, the hybrid vehicle 8 is provided with a electronic control device 60 consisting mainly of a microcomputer, and the engine 12 is composed such that the operating status thereof, such as throttle opening, intake air volume, fuel supply volume or ignition timing and the like, is electronically controlled by an electronic control unit for engine control (E-ECU) possessed by the electronic control device 60. In addition, detection signals from, for example, an accelerator depression amount sensor AS, which detects the amount an accelerator pedal 24 is depressed, or a brake sensor BS, for detecting the amount of depression of a brake pedal 26, are supplied to the above-mentioned E-ECU.

The first motor generator MG1 and the second motor generator MG2 are motor generators that are selectively operated as motors or generators in the form of, for example, synchronous motors provided with at least one of the function of a motor that generates drive torque and the function of a generator. The first motor generator MG1 and the second motor generator MG2 are connected to a battery, condenser or other electrical storage device 32 through inverters 28 and 30, and the output torque or regenerative torque of the first motor generator MG1 and the second motor generator MG2 is adjusted or set as a result of the inverters 28 and 30 being controlled by an electronic control unit for motor generator control (MG-ECU) possessed by the electronic control device 60. In addition, detection signals from, for example, an operating position sensor SS, which detects the operating position of a shift lever 34, or an output rotational speed sensor NS, which detects the rotational speed of the output shaft 14 relative to vehicle speed, are supplied to the above-mentioned MG-ECU.

The power distribution mechanism 16 is composed of a single pinion-type planetary gear device generating a differential action provided with three rotating elements in the form of a sun gear S0, a ring gear R0 arranged concentric to the sun gear S0, and a carrier CA0 that supports a pinion gear P0 that meshes with the sun gear S0 and the ring gear R0 while allowing to freely rotate and revolve. This planetary gear device is provided concentrically with the engine 12 and the automatic transmission 18. In addition, the input shaft 36 equivalent to a crankshaft of the engine 12 is coupled to the carrier CA0 of the power distribution mechanism 16 in the power transmission device 10. In contrast thereto, the sun gear S0 is coupled the first motor generator MG1 via the damper device 38, while the ring gear R0 is coupled to the output shaft 14. In the power distribution mechanism 16, the carrier CA0 functions as an input element, the sun gear S0 functions as a reaction element, and the ring gear R0 functions as an output element.

Figure 2:
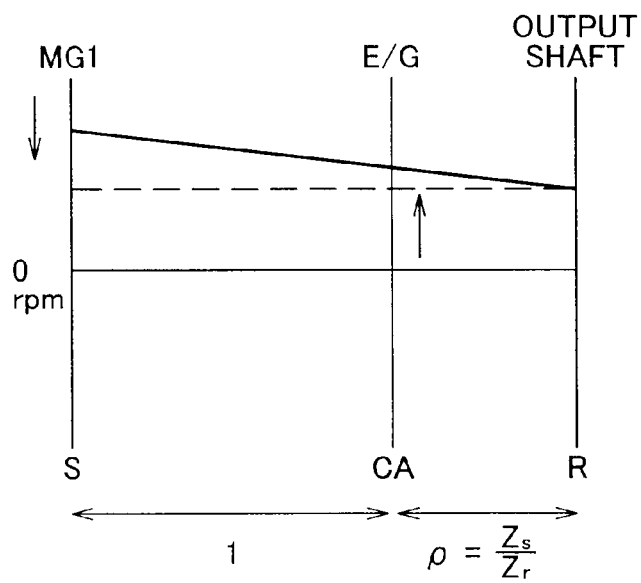
FIG. 2 is a collinear diagram showing the relative relationships among rotational speeds of each rotating element in a power distribution mechanism.

The relative relationship among the rotational speeds of each rotating element in the power distribution mechanism 16 is shown using the collinear diagram of FIG. 2. In this collinear diagram, the vertical axis S the vertical axis CA and the vertical axis R represent the rotational speeds of the sun gear S0, the carrier CA0 and the ring gear R0, and the mutual intervals between the vertical axis S, the vertical axis CA and the vertical axis R are set to be such that when the interval between the vertical axis S and the vertical axis CA is taken to be 1, the interval between the vertical axis CA and the vertical axis R becomes the gear ratio ρ (number of teeth Zs of sun gear S0/number of teeth Zr of ring gear R0). In this power distribution mechanism 16, when a reaction torque from the first motor generator MG1 is input to the sun gear S0 with respect to an output torque (engine torque) $T_E$ of the engine 12 input to the carrier CA0, since a torque larger than the torque input from the engine 12 is generated in the ring gear R0 serving as an output element, the first motor generator MG1 functions as a generator. Namely, in the power distribution mechanism 16, an electric transmission mechanism in the form of a continuously variable transmission is composed that is coupled to the engine 12 while allowing transmission of motive power, possesses a differential motor coupled while able to transmit motive power in the form of the first motor generator MG1, and for which the differential status thereof is controlled by controlling the operating status of the first motor generator MG1. Thus, the motive power of the engine 12 is transmitted to the output shaft 14 through this continuously variable transmission in the form of the power distribution mechanism 16.

As a result of controlling the differential status of the power distribution mechanism 16, the rotational speed $N_E$ of the engine 12 can be varied continuously by increasing or decreasing the rotational speed of the first motor generator MG1 when the rotational speed of the ring gear R0 (output shaft rotational speed) $N_{OUT}$ is constant. The broken line in FIG. 2 indicates the state in which the rotational speed of the engine 12 (engine rotational speed) $N_E$ decreases when the rotational speed of the first motor generator MG1 is lowered below the value indicated with the solid line. In addition, as a result of the power distribution mechanism 16 functioning as a continuously variable transmission, control that sets the engine 12 to the working point for which fuel consumption is optimal, for example (operating point is determined by, for example, engine rotational speed $N_E$ and engine torque $T_E$), can be executed by controlling the first motor generator MG1.

Returning to FIG. 1, the automatic transmission 18 is composed of a set of ravigneaux type planetary gear mechanisms. Namely, a first sun gear S1 and a second sun gear S2 are provided, a short pinion P1 meshes with the first sun gear S1 together with the short pinion P1 meshing with a long pinion P2 that is longer in the axial direction, and the long pinion P2 meshes with a ring gear R1 concentrically arranged with each of the sun gears S1 and S2. Each of the pinions P1 and P2 are retained by a common carrier CA1 while able to rotate and revolve freely. In addition, the second sun gear S2 meshes with the long pinion P2. In addition, the second motor generator MG2 is coupled to the second sun gear S2, and the carrier CA1 is coupled to the output shaft 14. The first sun gear S1 and the ring gear R1 compose a mechanism equivalent to a double pinion-type planetary gear device together with each of the pinions P1 and P2, while the second sun gear S2 and the ring gear R1 compose a mechanism equivalent to a single pinion-type planetary gear device together with the long pinion P2.

In addition, the automatic transmission 18 is provided with a first brake B1 for selectively locking the first sun gear S1 provided between the first sun gear S1 and a non-rotating member in the form of a transmission case 40, and a second brake B2 for selectively locking the ring gear R1 provided between the ring gear R1 and the transmission case 40. These brakes B1 and B2 constitute a so-called frictional engaging device that generates braking force by frictional force, are composed of, for example, a wet multi-plate hydraulic frictional engagement device in which a plurality of mutually overlapping friction plates are pressed together by a hydraulic actuator, or a band brake in which the ends of one or two bands coiled around the outer peripheral surface of a rotating drum are clamped by a hydraulic actuator, and selectively couple members on both sides between which they are interposed. The brakes B1 and B2 are composed so that the torque capacity of the brakes B1 and B2 changes continuously corresponding to hydraulic pressure (engaging pressure) of hydraulic fluid used to activate the brakes B1 and B2.

In the automatic transmission 18 composed in the manner described above, the second sun gear S2 functions as an input element, the carrier CA1 functions as an output element, and a high "2nd" gear having a gear ratio γsh larger than "1" is achieved when the first brake B1 is engaged. In addition, the automatic transmission 18 is composed so that a low "1st" gear having a gear ratio γsl larger than the gear ratio γsh of the "2nd" gear is set when the second brake B2 is engaged instead of the first brake B1. In this manner, the automatic transmission 18 is a mechanical transmission in which gears are switched by engagement and release of a hydraulic frictional engagement device.

Shifting between the above-mentioned "2nd" gear and "1st" gear is executed based on traveling status such as vehicle speed or required drive force associated values (target drive force associated values). More specifically, gear changing ranges determined experimentally in advance, for example, are stored in memory in the form of a map (shifting diagram), and shifting is controlled so as to set any of the gears corresponding to a detected operating status. An electronic control unit for transmission control (T-ECU) is provided in the electronic control device 60. Detection signals are supplied to this T-ECU from, for example, a hydraulic fluid temperature sensor TS for detecting a temperature of hydraulic fluid (hydraulic fluid temperature) $TH_{OIL}$, a hydraulic pressure switch SW1 for detecting engaging hydraulic pressure of the first brake B1, a hydraulic pressure switch SW2 for detecting engaging hydraulic pressure of the second brake B2, a hydraulic pressure switch SW3 for detecting line pressure PL, and an output rotational speed sensor NS.

In addition, the drive force associated values in the above-mentioned required drive force associated values correspond on a 1:1 basis with the drive force of the vehicle, and may consist of, for example, the output torque of the output shaft 14 (output shaft torque), engine torque or vehicle acceleration in addition to the drive torque or drive force of the driveshaft 22. In addition, although the required drive force associated values are required values (target values) related to drive force determined based on, for example, accelerator depression amount (or throttle valve opening, air intake volume, fuel-to-air ratio or fuel injection volume), the accelerator depression amount and the like may also be used directly.

Figure 3:
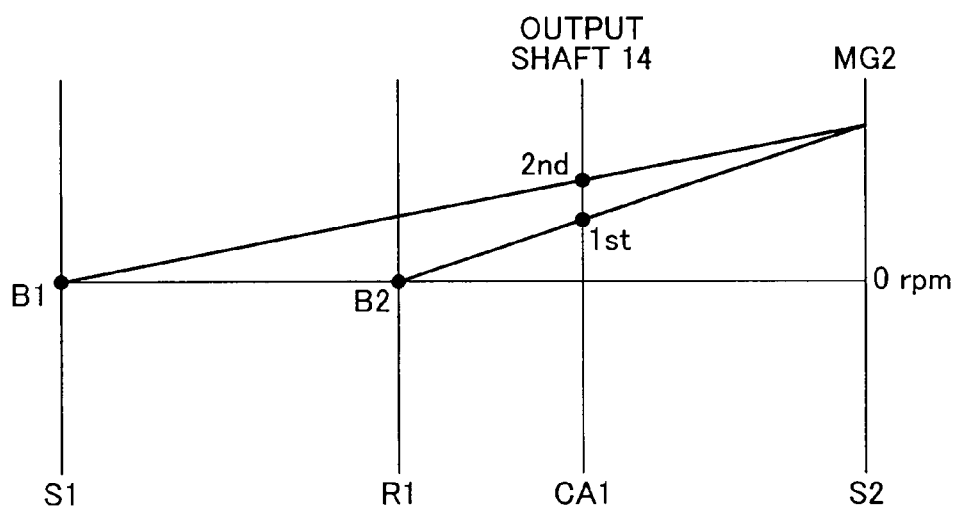
FIG. 3 is a collinear diagram showing the relative relationships among rotational speeds of each rotating element in an automatic transmission.

FIG. 3 indicates a collinear diagram having four axes consisting of a vertical axis S1, a vertical axis R1, a vertical axis CA1 and a vertical axis S2 for representing the mutual relationship among each rotating element for a rack and pinion-type planetary gear mechanism composing the automatic transmission 18. These vertical axes S1, R1, CA1 and S2 respectively indicate the rotational speeds of the first sun gear S1, the ring gear R1, the carrier CA1 and the second sun gear S2. In the automatic transmission 18, the low "1st" gear is set when the ring gear R1 is locked by the second brake B2, and an assist torque output by the second motor generator MG2 is increased corresponding to the gear ratio γsl at that time and applied to the output shaft 14. Alternatively, when the first sun gear S1 is locked by the first brake B1, the high "2nd" gear is set having a gear ratio γsh lower than the gear ratio γsl of the low "1st" gear. Since the gear ratio in this high "2nd" gear is also larger than "1", an assist torque output by the second motor generator MG2 is also increased corresponding to the gear ratio γsh at that time and applied to the output shaft 14. Furthermore, although the torque applied to the output shaft 14 is torque resulting from increasing the output torque of the second motor generator MG2 corresponding to the respective gear ratio in a state in which each of the "1st" and "2nd" gears have been set to a steady state, in a transient state of gear change in the automatic transmission 18, the resulting torque is subjected to effects such as the torque capacity of each of the brakes B1 and B2 or inertial torque accompanying changes in rotational speed. In addition, the torque applied to the output shaft 14 is positive torque (drive torque) in the state of driving the second motor generator MG2 and negative torque (braking torque) in the state the second motor generator MG2 is driven. Namely, regenerative braking force is generated by a regenerative operation in the state in which the second motor generator MG2 is driven.

Figure 4:
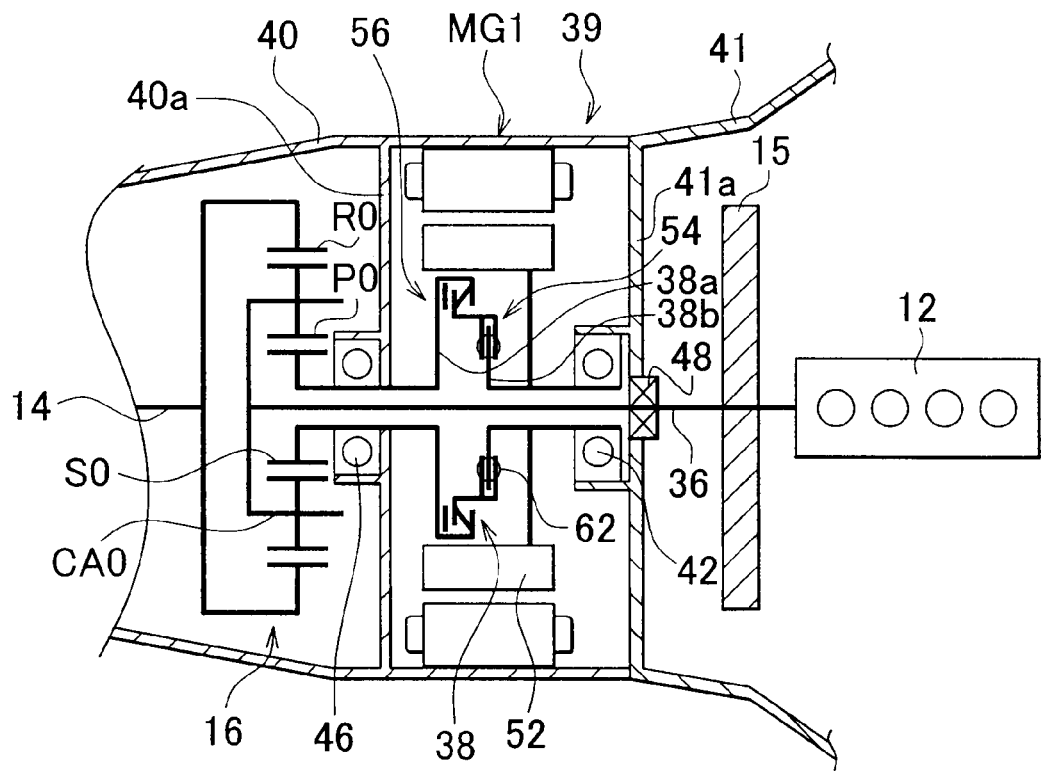
FIG. 4 is a drawing showing the positional relationship from a drive source to a power distribution mechanism in the hybrid vehicle (power transmission device) of FIG. 1.

FIG. 4 is a layout drawing representing the configuration of a power transmission device from the engine 12 to the power distribution mechanism 16 in the power transmission device 10 of FIG. 1. As shown in FIG. 4, the first motor generator MG1 (equivalent to the motor of the invention) is arranged between the engine 12 and the power distribution mechanism 16 composed of a planetary gear device within an axle case 39 protecting the power transmission device 10. The axle case 39 is composed of the transmission case 40 and a housing 41, and is integrally connected by bolts, for example, not shown. A partition 41a extending towards the shaft center is formed in the housing 41, and functions as a partition member for partitioning the inside of the transmission case 40 and the inside of the housing 41 while maintaining oil tightness. In addition, the partition 41a also functions as a support member for rotatably supporting the damper device 38 and the first motor generator MG1 by means of a bearing 42 about the shaft center.

As a result of interposing an oil seal 48 between the end of the partition 41a and the input shaft 36, the inside of the transmission case 40 is sealed liquid-tight. Here, an oil is supplied to the inside of the transmission case 40 from the inside of the input shaft 36 to immerse the first motor generator MG1, the power distribution mechanism 16 and the damper device 38. In addition, a support wall 40a extending towards the shaft center is formed in the transmission case 40, and rotatably supports the damper device 38 and the power distribution mechanism 16 by means of a bearing 46 about the shaft center.

The damper device 38 is arranged to be housed on the inner peripheral side of a rotor 52 of the first motor generator MG1, an input portion 38a of the damper device 38 is coupled to the sun gear S0 of the power distribution mechanism 16, while an output portion 38b is coupled to the rotor 52 of the first motor generator MG1. The input portion 38a and the output portion 38b of the damper device 38 are coupled so as to be able to transmit motive power through a damper mechanism 54 and a torque limiter mechanism 56.

In the damper mechanism 54, a coil spring 62 is interposed between the input portion 38a and the output portion 38b, and fluctuations in torque of the engine 12 input from the input portion 38a through the power distribution mechanism 16 are absorbed by the elasticity of the coil spring 62. Moreover, the damper mechanism 54 can also have a hysteresis mechanism composed of a friction material and the like not shown, and fluctuations in torque are also absorbed by this hysteresis mechanism.

The torque limiter mechanism 56 is composed of a friction member or disc spring and the like, and when torque of a magnitude equal to or greater than a prescribed value exceeding torque capacity of the damper device 38 is transmitted, the input portion 38a and the output portion 38b are rotated freely (relatively rotated) against the frictional force of the friction member, thereby preventing transmission of excess torque equal to or greater than the prescribed value, and preventing damage of the damper device 38. Furthermore, the above-mentioned prescribed torque is set based on a preliminary endurance test and the like of the damper device 38 conducted.

If the damper device 38 is provided in a power transmission path between the power distribution mechanism 16 and the first motor generator MG1 as described above, since reaction torque with respect to drive torque $T_E$ of the engine 12 is transmitted to the damper device 38 through the power distribution mechanism 16, the transmitted torque is less than in the case of a damper device being provided between the engine 12 and the power distribution mechanism 16, for example. More specifically, the reaction torque dealt by the damper device 38 based on the gear ratio ρ of the power distribution mechanism 16 and the frictional force of the power distribution mechanism 16 is less than the drive torque $T_E$ of the engine 12. Thus, when designing the damper device 38, since input torque acting on the damper device 38 becomes smaller, the capacity of the damper device 38 also becomes smaller. Here, since the size of a damper device is typically proportional to the torque capacity of the damper device, the size of the damper device 38 can be reduced.

As a result, since it is possible to shorten the damper device 38 in the radial direction, the damper device 38 can be housed on the inner peripheral side of the rotor 52 of the first motor generator MG1 as previously described. Here, since entrance of water into the transmission case 40 that is sealed to be oil tight is prevented by partitioning to be oil tight with the partition 41a of the housing 41 and arranging the oil seal 48, water is prevented from entering the power distribution mechanism 16, the first motor generator MG1 and the damper device 38. In addition, since the power distribution mechanism 16, the first motor generator MG1 and the damper device 38 are immersed in oil and oil is stably supplied to the damper device 38, rusting of the coil spring 62 of the damper device 38 and a spring positioning collar and the like not shown for holding the coil spring 62 is prevented, thereby stabilizing the usage environment of the damper device 38. In addition, since a friction member not shown of the damper mechanism 54 and a friction member of the torque limiter 56 also function as wet friction materials based on the supply of oil, the friction coefficients of the friction materials are stable thereby inhibiting variations in performance of the friction materials.

As has been described above, according to this embodiment, since the damper device 38 is provided in a power transmission path between the power distribution mechanism 16 and the first motor generator MG1, direct transmission of drive torque $T_E$ of the engine 12 is avoided. More specifically, as a result of being composed in the manner described above, the damper device 38 receives only reaction torque dealt by the first motor generator MG1 through the power distribution mechanism 16 with respect to drive torque $T_E$ of the engine 12. Thus, since torque transmitted to the damper device 38 is smaller than the drive torque $T_E$ of the engine 12, the torque capacity of the damper device 38 can be decreased, and as a result thereof, the size of the damper device 38 can be reduced. Consequently, the overall size of the power transmission device 10 can be similarly reduced.

In addition, according to this embodiment, since the damper device 38 is housed on the inner peripheral side of the rotor 52 of the first motor generator MG1, the shaft length of the power transmission device 10 can be shortened. Furthermore, the above-mentioned configuration can be realized based on a configuration that enables the size of the damper device 38 to be reduced. In addition, as a result of housing on the inner peripheral side of the rotor 52 of the first motor generator MG1, the first motor generator MG1 is cooled by oil and the damper device 38 is immersed in oil. Thus, since there is no occurrence of problems such as rusting of the damper device 38 and the operating status of the coil spring 62, spring positioning collar and so forth of the damper device 38 is stable, the reliability of the damper device 38 is improved. Moreover, the reliability of the damper device 38 is also improved since the friction coefficient of the friction material interposed in the hysteresis mechanism and the like of the damper device 38 is stable.

In addition, according to this embodiment, since the carrier CA0 of the power distribution mechanism 16 composed of a planetary gear device is coupled to the engine 12, the sun gear S0 is coupled to the first motor generator MG1 through the damper device 38, and the ring gear R0 is coupled to the output shaft 14, input torque transmitted to the damper device 38 is smaller than drive torque $T_E$ of the engine 12 due to the power distribution mechanism 16. Thus, the damper device 38 can be designed to have a lower torque capacity, thereby making it possible to reduce the size of the damper device 38.

In addition, according to this embodiment, since the damper device 38 is provided with the torque limiter mechanism 56, and torque equal to or greater than a prescribed value is not transmitted to the damper device 38 as a result of slipping when torque of a magnitude equal to or greater than the prescribed value is transmitted thereto, damage to the damper device 38 is prevented.

Although the above has provided a detailed explanation of an embodiment of the invention based on the drawings, the invention is also applied in other aspects as well.

For example, in the embodiment described above, the manner in which the power transmission device 10 is installed on a vehicle may be in the form of a transverse orientation such as in a front-engine, front-drive (FF) vehicle in which the axial line of the drive device is in the direction of vehicle width, or in the form of a longitudinal orientation such as in an FR vehicle in which the axial line of the drive device is in the longitudinal direction of the vehicle. In addition, the invention can also be applied to a power transmission device for four-wheel drive.

In addition, although motive power is transmitted to the output shaft 14 from the second motor generator MG2 via the two-stage automatic transmission 18 in the previously described embodiment, there are no particular limitations on the number of gears or configuration of the automatic transmission 18, and they can be altered freely. In addition, the automatic transmission 18 is not necessarily required, and a configuration may be employed in which the second motor generator MG2 is coupled directly to the output shaft 14.

In addition, in the embodiment described above, although the damper device 38 is housed on the inner peripheral side of the rotor 52 of the first motor generator MG1, it is not necessary required to be housed on the inner peripheral side of the rotor 52, but rather may also be arranged at another site. Even if a configuration is employed in which the damper device 38 is not housed on the inner peripheral side of the rotor 52, the effects of the invention of being able to reduce the size and weight of the damper device 38 can still be adequately obtained.

In addition, in the embodiment described above, although a configuration was employed in which the carrier CA0 of the power distribution mechanism 16 is coupled to the engine 12, the sun gear S0 is coupled to the first motor generator MG1 via the damper device 38, and the ring gear R0 is coupled to the output shaft 14, this is merely one example of a coupling configuration, and the coupling configuration can be changed freely provided reaction torque acting on the first motor generator MG1 is smaller than the drive torque of the engine 12.

In addition, in the embodiment described above, although the torque limiter mechanism 56 is arranged to the outside in the radial direction of the damper mechanism 54 in the damper device 38, the structure of the damper device 38 is not limited thereto, but rather a configuration may also be employed in which the damper mechanism 54 is located farther to the outside than the torque limiter mechanism 56. In addition, the damper mechanism 54 and the torque limiter mechanism 56 may also be arranged to as to be superimposed in the direction of the shaft center.

In addition, in the embodiment described above, although the first motor generator MG1 and the damper device 38 are arranged between the engine 12 and the power distribution mechanism 16, the positional arrangement thereof is not necessarily limited thereto, but rather the positional relationship thereof may be changed within a range that is not contradictory, such as by arranging the first motor generator MG1 and the damper device 38 downstream from the power distribution mechanism 16 (on the side of the automatic transmission 18).

In addition, in the embodiment described above, although the flywheel 15 is provided on the input shaft 36, the shaft length of the input shaft 36 can also be shortened by, for example, internalizing the flywheel 15 within the engine 12.

Furthermore, the embodiments described above are intended to be exemplary, and the invention can be embodied in other aspects to which various changes or modifications have been added based on the knowledge of a person with ordinary skill in the art.

What is claimed is:

1. A hybrid vehicle power transmission device, comprising:
    a drive source;
    a power distribution mechanism composed of a planetary gear device for distributing motive power of the drive source to a motor and an output shaft; and
    a damper device provided in a power transmission path between the power distribution mechanism and the motor.

2. The hybrid vehicle power transmission device according to claim 1, wherein the damper device is housed on the inner peripheral side of a rotor of the motor.

3. The hybrid vehicle power transmission device according to claim 1, wherein:
    a carrier of the planetary gear device is coupled to the drive source,
    a sun gear of the planetary gear device is coupled to the motor through the damper device, and
    a ring gear of the planetary gear device is coupled to the output shaft.

4. The hybrid vehicle power transmission device according to claim 1, wherein:
    the damper device is provided with a torque limiter mechanism, and
    when torque of a magnitude equal to or greater than a prescribed value is applied, the hybrid vehicle power transmission device does not allow the torque equal to or greater than the prescribed value to be transmitted as a result of slipping.

5. A hybrid vehicle comprising the hybrid vehicle power transmission device according to claim 1.

* * * * *